(12) United States Patent
Kuno et al.

(10) Patent No.: US 6,891,962 B1
(45) Date of Patent: May 10, 2005

(54) FINGERPRINT SENSOR AND FINGERPRINT RECOGNITION SYSTEM

(75) Inventors: Tetsuya Kuno, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/392,294

(22) Filed: Sep. 8, 1999

(30) Foreign Application Priority Data

Sep. 14, 1998  (JP) ............................. 10-260406
Sep. 14, 1998  (JP) ............................. 10-260407

(51) Int. Cl.$^7$ ................................................ G06K 9/00
(52) U.S. Cl. ...................... 382/127; 356/71; 359/837
(58) Field of Search ............................. 382/127, 124, 382/116; 340/5.52, 5.53; 356/71; 359/831, 837

(56) References Cited

U.S. PATENT DOCUMENTS

| | | | |
|---|---|---|---|
| 3,975,711 A | * 8/1976 | McMahon | 250/550 |
| 5,650,842 A | * 7/1997 | Maase et al. | 356/71 |
| 5,796,858 A | * 8/1998 | Zhou et al. | 235/382 |
| 5,859,420 A | * 1/1999 | Borza | 250/208.1 |
| 6,127,674 A | * 10/2000 | Shinzaki et al. | 250/227.28 |
| 6,185,319 B1 | * 2/2001 | Fujiwara | 356/71 |

OTHER PUBLICATIONS

By Shimizu et al., the Transaction of the Inst. of Electronics and Communication Engineers of Japan, vol. J68–D, No. 3, Mar. 1985, pp. 414–415.

By Igaki et al., the Transaction of the Inst. of Electronics and Communication Engineers of Japan, vol. J68–D, No. 3, 1985.

By R.D. Bauguna et al., Sep. 10, 1996, vol. 35, No. 26, Applied Optics.

* cited by examiner

Primary Examiner—Amelia M. Au
Assistant Examiner—Charles Kim
(74) Attorney, Agent, or Firm—Birch, Stewart, Kolasch & Birch, LLP.

(57) ABSTRACT

A fingerprint sensor used for a fingerprint recognition system comprises a first prism or prism array including a first surface which a human finger is placed and a second surface; a lamp for irradiating the finger with light; a second prism or prism array for refracting the light which is reflected from the finger and subsequently passes through the second surface in such a way that the light refracted by the second prism or prism array travels along a path closer to a normal to the first surface of the first optical component than a path of light without refraction by the second prism or prism array; and an image sensor for receiving the light refracted by the second prism or prism array and converting fingerprint information for the finger into an electric signal.

8 Claims, 13 Drawing Sheets

RIDGE ENDING

BIFURCATION

DIRECTION ANGLE DATA

FINGERPRINT SENSOR AND FINGERPRINT RECOGNITION SYSTEM

BACKGROUND OF THE INVENTION

1. Field of the Invention

The present invention relates to a fingerprint sensor for receiving light reflected from a human finger and outputting an electrical signal regarding fingerprint information and a fingerprint recognition system incorporating the fingerprint sensor, and particularly relates to their optical components.

2. Description of the Prior Art

A prior art fingerprint sensor is disclosed, for example, in a paper entitled "Entry Method of Fingerprint Image with Prism—Comparison between Total Reflection Method and Light-Path Separation Method—", by Shimizu et al., the Transaction of the Inst. of Electronics and Communication Engineers of Japan, Vol.J68-D, No.3, March 1985, pp. 414–415.

FIG. 27 is a diagram schematically showing a configuration of a prior art fingerprint recognition system utilizing the fingerprint sensor disclosed in the paper. The fingerprint recognition system of FIG. 27 comprises a triangular prism 1 including a first surface 1a on which a human finger 8 is placed, a second surface 1b, and a third surface 1c. The first surface 1a is surrounded by a cover plate 9. The fingerprint recognition system also comprises a light source 3 for irradiating the finger 8 with light, a condenser lens 4 for collecting light reflected by the finger 8, an image-sensing device 5 for receiving the reflected light, a signal processor 6, and a fingerprint recognition section 7. In the fingerprint recognition system, the light source 3 irradiates the finger 8 through the third surface 1c of the triangular prism 1 with light. The light is reflected by the finger 8 placed on the first surface 1a, passes through the second surface 1b, and is collected by the condenser lens 4, thereby directed to the image-sensing device 5.

A disadvantage of the prior art fingerprint recognition system described above is that an image sensed by the image-sensing device 5 is subjected to trapezoidal distortion because the condenser lens 4 and the image-sensing device 5 are disposed at an angle with respect to the finger 8 as a subject to be sensed. FIG. 28A and FIG. 28B are diagrams showing regularly arranged multiple squares as a subject to be sensed and a trapezoidal-distorted image of the regularly arranged multiple squares in the prior art fingerprint recognition system, respectively. In the prior art system, the multiple squares (FIG. 28A) on the first surface 1a is projected as the trapezoidal-distorted image (FIG. 28B) on the image-sensing device 5.

Since the trapezoidal distortion interferes with the fingerprint recognition, a sufficiently long distance must be kept between the finger 8 and the image-sensing device 5 so that the effect of the trapezoidal distortion can be reduced. This is because as the image-sensing device 5 is placed closer to the finger 8, the degree of trapezoidal distortion increases. Therefore, it has been difficult to shrink the size of the fingerprint recognition system or fingerprint sensor.

Another method known to reduce the effect of the trapezoidal distortion is to use a fiber optics plate (FOP) instead of the triangular prism. However, the FOP is a very expensive optical component and has a great volume in comparison with the optical image forming system (the triangular prism and the lens), so that it still has been difficult to downsize the fingerprint recognition system or fingerprint sensor.

SUMMARY OF THE INVENTION

It is an object of the present invention to provide a fingerprint sensor that can reduce trapezoidal distortion of a fingerprint image and can be scaled down by decreasing a distance between a human finger and an image sensor, and to provide a fingerprint recognition system incorporating the fingerprint sensor.

According to the present invention, a fingerprint sensor comprises a first optical component including a first surface on which a human finger is placed and a second surface which forms a certain angle with respect to the first surface; means for irradiating the finger placed on the first surface with light; a second optical component for refracting the light which is reflected from the finger and subsequently passes through the second surface of the first optical component in such a way that the light refracted by the second optical component travels along a path closer to a normal to the first surface of the first optical component than a path of light without refraction by the second optical component; and an image sensor for receiving the light refracted by the second optical component and converting fingerprint information for the finger into an electric signal.

The first optical component may be a triangular prism or a prism array. The second optical component may be a triangular prism or a prism array.

According to the present invention, a fingerprint recognition system comprises the above-mentioned fingerprint sensor and a section for identifying the fingerprint of the finger on the basis of the electrical signal from the fingerprint sensor.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

First Embodiment

Figure 1:
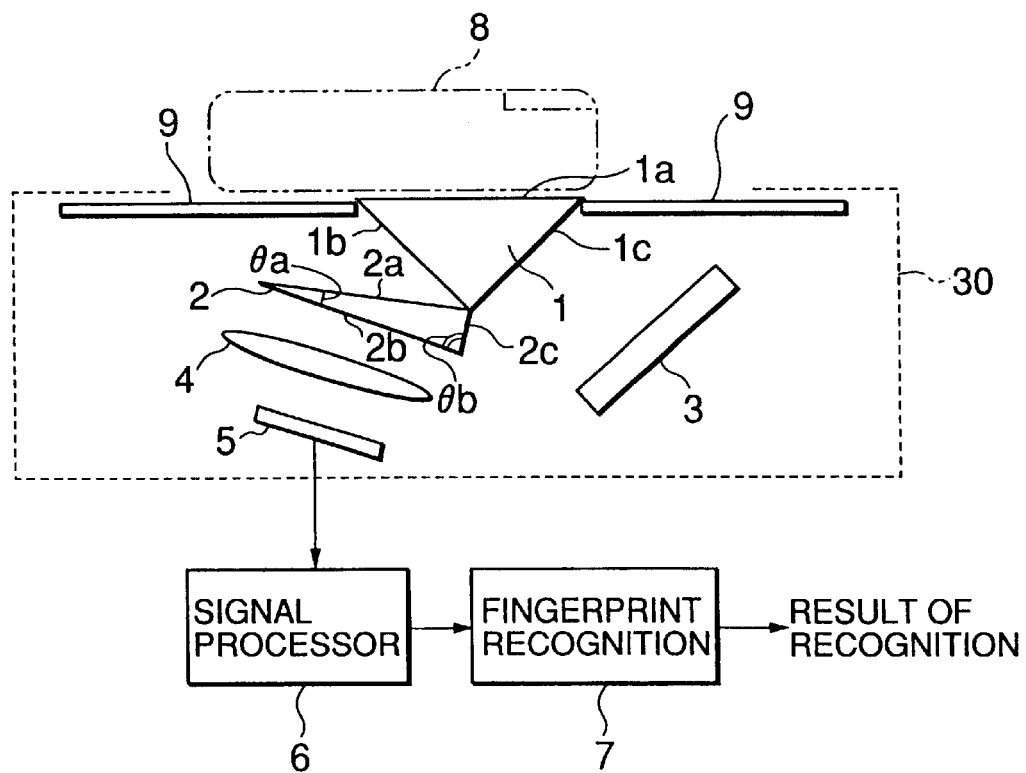
FIG. 1 is a diagram schematically showing a configuration of a fingerprint recognition system according to a first embodiment of the present invention.

FIG. 1 a diagram schematically showing a configuration of a fingerprint recognition system according to a first embodiment of the present invention. As shown in FIG. 1, the fingerprint recognition system of the first embodiment comprises a fingerprint sensor 30 for receiving a fingerprint image (or light reflected from a fingerprint of a human finger 8) and outputting a fingerprint information signal, a signal processor 6 for performing a signal processing on the fingerprint information signal, and a fingerprint recognition section 7 for identifying the fingerprint.

The fingerprint sensor 30 includes a first triangular prism 1 made of glass or plastic material, a second triangular prism 2 made of glass or plastic material, which has a different shape from the first triangular prism 1. The fingerprint sensor 30 also includes a light source 3 for irradiating the finger 8 with light, the condenser lens 4, and an image-sensing device 5 for sensing the fingerprint image of the finger 8.

The first triangular prism 1 has a first surface 1a, on which the finger 8 as a subject to be sensed is placed, a second surface 1b, which forms a certain angle with respect to the first surface 1a, and a third surface 1c, which extends in a direction almost perpendicular to the second surface 1b. The first surface 1a is surrounded by a cover plate 9. It is preferable that the first surface 1a has such sufficient area that the whole fingerprint of the finger 8 can be placed. Further, a shape of the first triangular prism 1 is not limited to that shown in FIG. 1.

The second triangular prism 2 is disposed on a side of the second surface 1b of the first triangular prism 1, through which light reflected from the finger 8 passes. The second triangular prism 2 has a fourth surface 2a, a fifth surface 2b, and a sixth surface 2c. The reflected light passing through the second surface 1b of the first triangular prism 1 enters the second triangular prism 2 from the fourth surface 2a and is emitted from the fifth surface 2b. In the second triangular prism 2, an angle θa formed by the fourth surface 2a and the fifth surface 2b is smaller than an angle θb formed by the fifth surface 2b and the sixth surface 2c. The second triangular prism 2 refracts light, which is reflected from the finger 8 placed on the first surface 1a and which passes through the second surface 1b, to travel along a path closer to a normal to the first surface 1a than a path of light without refraction by the second triangular prism 2. Further, a shape of the second triangular prism 2 is not limited to that shown in FIG. 1.

The signal processor 6 performs a processing on the fingerprint image information-output from the image-sensing device 5. The fingerprint recognition section 7 judges whether the finger 8 is of a person to be verified or whether the finger 8 is of one of any person registered in advance, based on the fingerprint image information supplied from the signal processor 6, according to the identification algorithm for fingerprint recognition, and outputs a result of the judgment.

The operation of the fingerprint recognition system will next be described. The light source 3 emits light toward the finger 8 placed on the first surface 1a of the first triangular prism 1 through the third surface 1c of the first triangular prism 1. The light source 3 is disposed in such a manner that the emitted light strikes the first surface 1a of the first triangular prism 1 obliquely, for example, at an incident angle of approximately 45 degrees.

Figure 2:
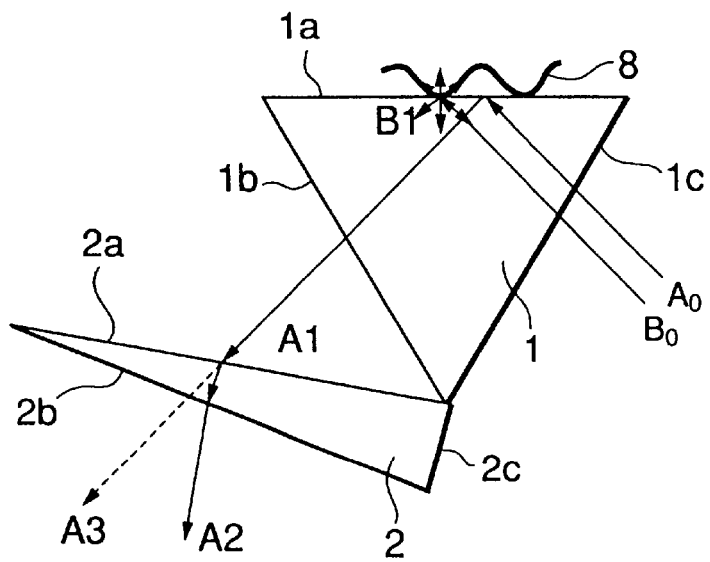
FIG. 2 is a diagram illustrating how a fingerprint placed on the first triangular prism of FIG. 1 reflects light emitted from the light source.

FIG. 2 is a diagram illustrating how a fingerprint placed on the first triangular prism 1 reflects light emitted from the light source 3. As shown in FIG. 2, the finger 8 of the person to be identified is placed on the first surface 1a of the first triangular prism 1. The light emitted from the light source 3 (not shown in FIG. 2) passes through the third surface 1c of the first triangular prism 1 and is reflected by the first surface 1a (also referred to as a bottom) of the first triangular prism 1, and the reflected light comes out of the second surface 1b of the first triangular prism 1.

The human finger 8 has ridges and valleys forming a fingerprint. The ridges of the fingerprint come into contact with the first surface 1a of the first triangular prism 1 while the valleys of the fingerprint do not come into contact with the first surface 1a of the first triangular prism 1. Of the light from the light source 3, a ray $A_0$ striking an area of the first surface 1a which is not in contact with the finger 8 (directly below the valley) is totally reflected by the first surface 1a, and a reflected ray $A_1$ passes through the second surface 1b and strikes the fourth surface 2a of the second triangular prism 2. Of the light from the light source 3, a ray $B_0$ striking an area of the first surface 1a which is in contact with the finger 8 (directly below the ridge) is dispersed on the first surface 1a to form a dispersed ray $B_1$, and a small part of the dispersed ray $B_1$ reaches the fourth surface 2a of the second triangular prism 2. Therefore, between the rays which are reflected by the first surface 1a of the first triangular prism 1 and strike the image-sensing device 5, the reflected ray $A_1$ has a higher intensity than the ray $B_1$. This means that the image-sensing device 5 senses the rays corresponding to the valleys of the fingerprint as having a higher intensity than the rays corresponding to the ridges and obtains a fingerprint image accordingly.

After coming out of the second surface 1b of the first triangular prism 1, the reflected rays $A_1$ and $B_1$ of the fingerprint are refracted in the second triangular prism 2 so that the light paths become closer to the normal (a vertical direction in FIG. 1) to the first surface 1a. If the second triangular prism 2 is not provided, the light path of the reflected ray $A_1$ would be as indicated by a broken line $A_3$. Actually, the second triangular prism 2 refracts the ray toward the normal to the first surface 1a, as indicated by a solid line $A_2$.

Figure 3:
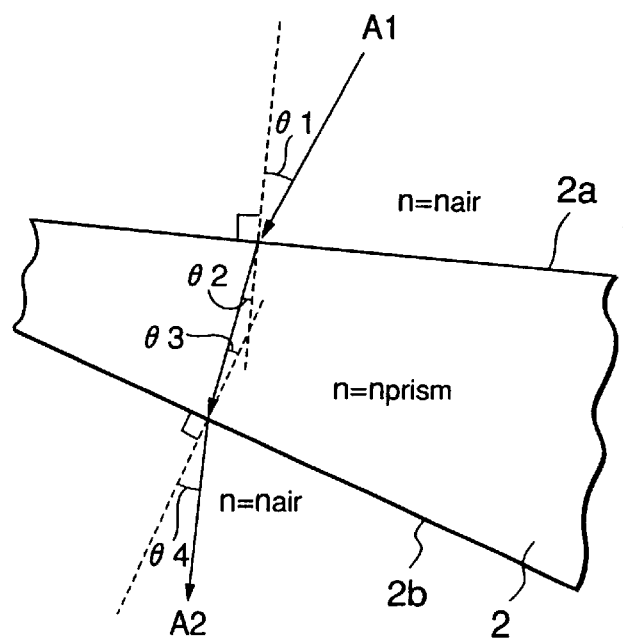
FIG. 3 is a diagram illustrating how the second triangular prism of FIG. 1 refracts light from the first triangular prism.

FIG. 3 is a diagram illustrating how the second triangular prism 2 refracts light from the first triangular prism 1. Let a refractive index of air be $n_{air}$, a refractive index of the second triangular prism 2 be $n_{prism}$, an angle of incidence and an angle of refraction of the reflected ray $A_1$ on the fourth surface 2a be $\theta_1$ and $\theta_2$, respectively, and an angle of incidence and an angle of refraction of the reflected ray $A_1$ on the fifth surface 2b be $\theta_3$ and $\theta_4$, respectively. By Snell's law, the following expressions can be provided:

$$n_{air}*\sin\theta_1 = n_{prism}*\sin\theta_2$$

$$n_{prism}*\sin\theta_3 = n_{air}*\sin\theta_4$$

If the second triangular prism 2 is made of a material such as glass and plastic, the following relationship is satisfied:

$$n_{air} < n_{prism}$$

Therefore, the following relationships are satisfied:

$$\theta_1 > \theta_2 \text{ and } \theta_3 < \theta_4$$

Figure 4:
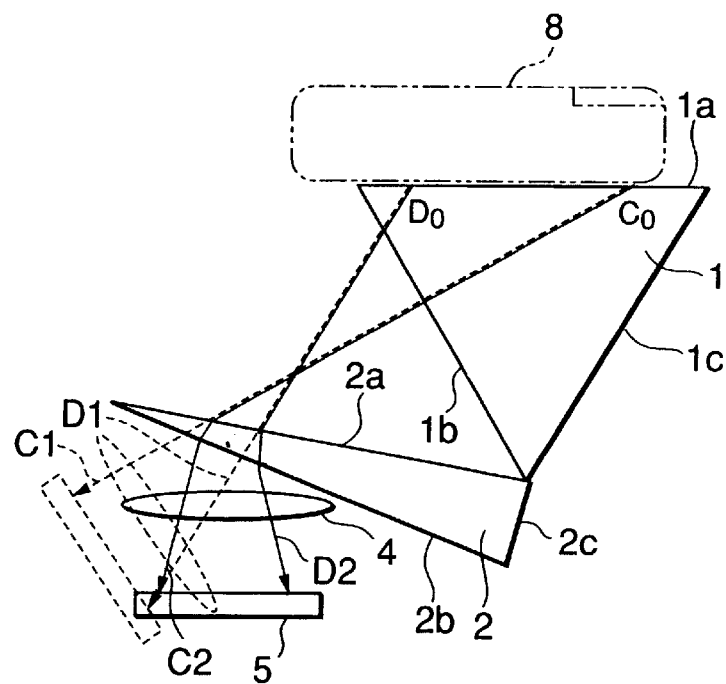
FIG. 4 is a diagram illustrating how the fingerprint sensor of FIG. 1 forms a fingerprint image on the image-sensing device.

FIG. 4 is a diagram illustrating how the fingerprint sensor 30 forms the fingerprint image on the image-sensing device 5. Letting $C_0$ and $D_0$ be different portions of the finger 8 placed on the first surface 1a of the first triangular prism 1, the ray reflected from the portion $C_0$ and the ray reflected from the portion $D_0$ respectively travel along the light paths $C_1$ and $D_1$ indicated by broken lines before an image is formed on the image-sensing device 5 indicated by a broken line if the second triangular prism 2 is not provided.

Figure 5:
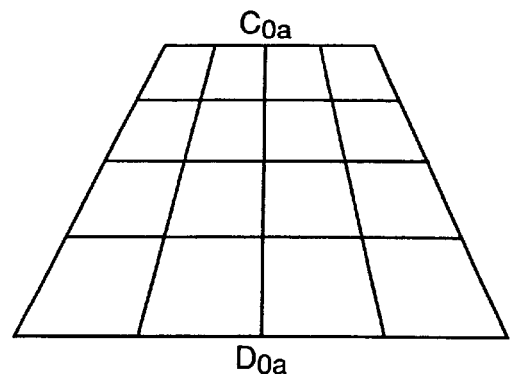
FIG. 5 is a diagram showing a trapezoidal-distorted image of regularly arranged multiple squares in a prior art fingerprint recognition system.

FIG. 5 is a diagram showing a trapezoidal-distorted image of regularly arranged multiple squares in a prior art fingerprint recognition system which is not provided with the second triangular prism 2. If the fingerprint in contact with the first surface 1a of the first triangular prism 1 is sensed at an angle, the light path length along the light path $D_1$ is shorter than the light path length along the light path $C_1$. This causes the fingerprint image to be subjected to trapezoidal distortion as shown in FIG. 5. The symbols $C_{0a}$ and $D_{0a}$ indicated on the trapezoid in FIG. 5 are parts of the image corresponding to the portions $C_0$ and $D_0$ of the finger 8 shown in FIG. 4.

Figure 6:
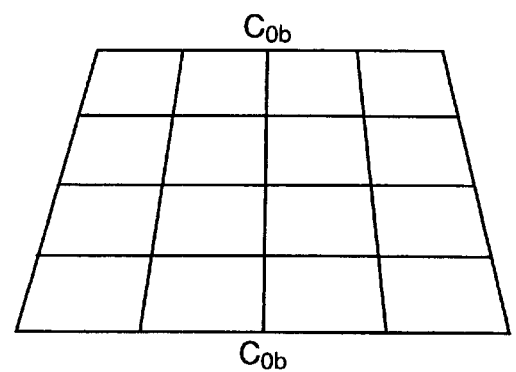
FIG. 6 is a diagram showing a trapezoidal-distorted image of regularly arranged multiple squares in the fingerprint recognition system of FIG. 1.

Actually, in the first embodiment, in which the second triangular prism 2 is disposed to pass the light reflected by the first surface 1a of the first triangular prism 1, the rays reflected from the portions $C_0$ and $D_0$ of the finger 8 shown in FIG. 4 are refracted by the second triangular prism 2, travel along the light paths $C_2$ and $D_2$ indicated by solid lines, and form an image on the image-sensing device 5. The difference between the light path length of the light path $C_2$ and the light path length of the light path $D_2$ when the light paths are refracted by the second triangular prism 2 as indicated by the solid lines in FIG. 4 is smaller than the difference between the light path length of the light path $C_1$ and the light path length of the light path $D_1$ when the second triangular prism 2 is not provided. Therefore, the trapezoidal distortion of the image formed on the image-sensing device 5 as shown in FIG. 6 is lower than the prior art trapezoidal distortion as shown in FIG. 5. The symbols $C_{0b}$ and $D_{0b}$ indicated on the trapezoid in FIG. 6 are parts of the image corresponding to the portions $C_0$ and $D_0$ of the finger 8 shown in FIG. 4.

Figure 7:
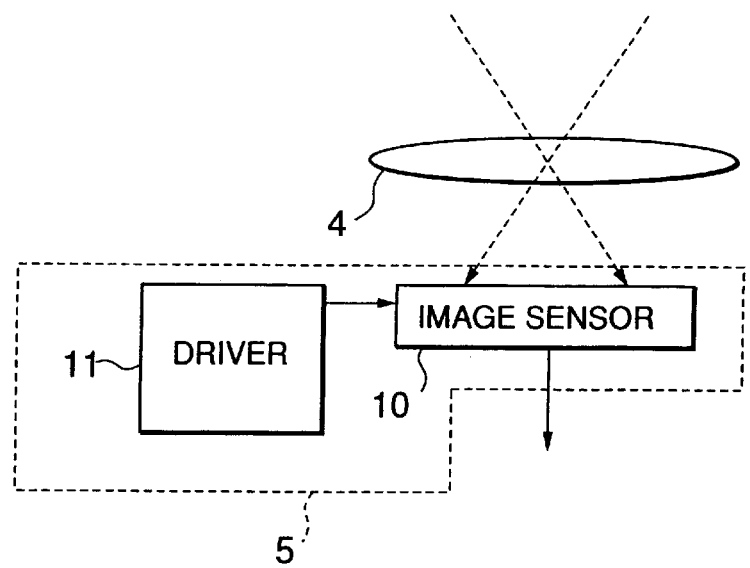
FIG. 7 is a diagram showing a configuration of the image-sensing device of FIG. 1.

FIG. 7 is a diagram showing a configuration of the image-sensing device 5. The image-sensing device 5 includes an image sensor 10 for sensing the reflected light refracted by the second triangular prism 2 on its image-forming surface through the condenser lens 4, and a driver 11 for driving the image sensor 10.

The fingerprint image information sensed by the image-sensing device 5 is input to the signal processor 6 as an electric signal. The signal processor 6 performs a signal processing to reduce a noise such as too thin image (a blurry line, for instance) or too thick image (overlapped lines, for instance) in the image of ridges and valleys of the finger 8 sensed by the image-sensing device 5, to adjust the level of the image, to adjust the contrast, to perform aperture correction, to eliminate inconsistencies in illumination or density, to perform binarization, and the like. The signal processor 6 performs a signal processing to produce a fingerprint image that fits the algorithm of fingerprint recognition by the fingerprint recognition section 7 in the next stage.

Based on the fingerprint image information provided by the signal processor 6, the fingerprint recognition section 7 detects feature points of the fingerprint, judges whether the finger 8 is of a person to be verified or whether the finger 8 is of one of any person registered in advance, and outputs a result of the judgment.

A variety of identification methods for judging whether a registered fingerprint matches the fingerprint input from the image-sensing device 5 have been presented. Some typical identification methods are described below.

Typical identification methods are a feature point matching method, a direction code matching method, a binary image pattern matching method, a projection matching method, an FFT method, and the like.

Figure 8A:
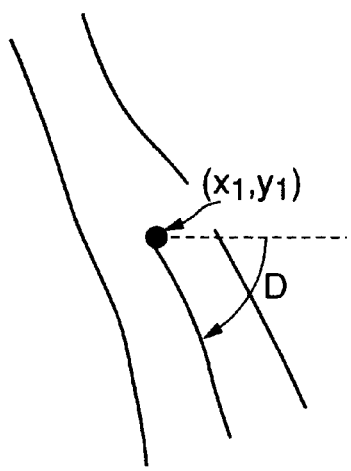
FIG. 8A and FIG. 8B are diagrams showing feature points of a fingerprint.
Figure 8B:
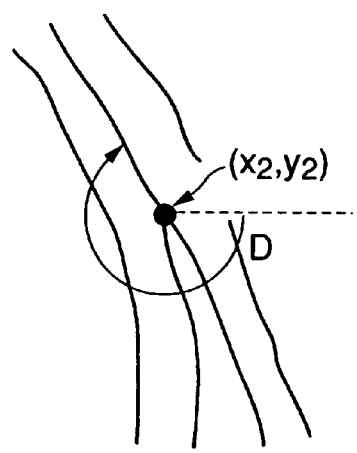

An overview of the feature point matching is given here. A fingerprint has some points where ridges end (ridge ending) ($x_1$, $y_1$,) and divide (bifurcation) ($x_2$, $y_2$), as shown in FIG. 8A and FIG. 8B. These points are referred to as feature points, and it is known that the layout of the feature points varies by person and by finger. A common method uses the positions of the feature points, directions of ridges extending from the feature points, and other minutiae data and identifies a fingerprint according to the degree of data matching.

Figure 9:
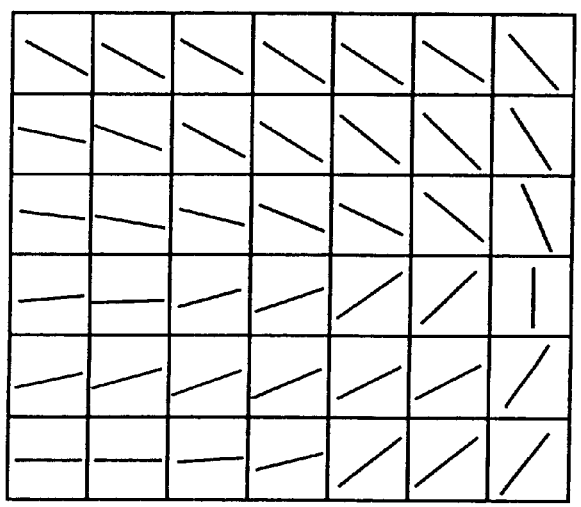
FIG. 9 is a diagram showing direction angle data of a fingerprint.

The direction code matching method uses the coded direction of the main stream of ridges of a fingerprint to identify the fingerprint. For instance, as shown in FIG. 9, a fingerprint image is divided into some small areas, and the directions of ridges in those areas are quantified and used for identification. In an area with much noise, an extracted direction of ridges would be unstable and would be corrected with consideration given to the information of circumstances.

As has been described above, the second triangular prism 2 is provided in the fingerprint sensor 30 in order to refract the light path of the fingerprint image reflected by the first surface 1a of the first triangular prism 1, so that the condenser lens 4 and the image-sensing device 5 can be placed near the finger 8 as a subject to be sensed. Therefore, the fingerprint sensor 30 of the first embodiment can reduce trapezoidal distortion in a sensed image, and the entire fingerprint sensor 30 can be reduced in size.

The fingerprint recognition system of the present invention comprises the fingerprint sensors 30 described above together with the signal processor 6 and the fingerprint recognition section 7, so that highly accurate fingerprint recognition can be implemented by the compact system.

Figure 10:
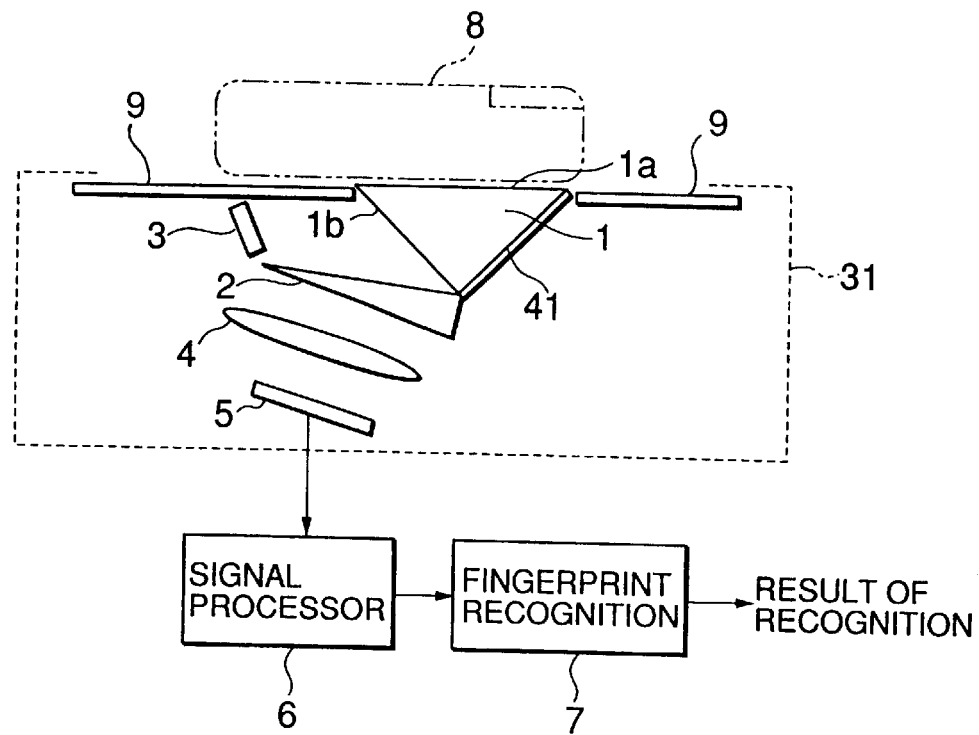
FIG. 10 is a diagram schematically illustrating a modified configuration of the fingerprint recognition system according to the first embodiment of the present invention.

FIG. 10 is a diagram schematically illustrating a modified configuration of the fingerprint recognition system according to the first embodiment of the present invention. In FIG. 10, the light path separation method is implemented, so the light source 3 is disposed on a side of the image-sensing device 5. In the fingerprint sensor 31 of FIG. 10, just the rays of light dispersing from the ridges of the fingerprint are detected to obtain a fingerprint image. In the fingerprint sensor 31 of this configuration, however, the third surface 1c of the first triangular prism 1, opposite to the surface hit by the light emitted from the light source 3, must have a black layer of coating 41 to prevent reflection from the third surface 1c.

An example utilizing the first triangular prism 1 and the second triangular prism 2 has been described above but the prisms are not necessarily triangular prisms and may be optical components having other cross-sectional profiles. The first triangular prism 1 can be replaced by a first optical component which satisfies the minimum requirement of having the first surface 1a on which the finger 8 is placed and the second surface 1b from which the light reflected by the first surface 1a comes out. Consequently, the first optical component can be a component having the first surface 1a and the second surface 1b with another cross-sectional profile (a prism which has a cross-sectional profile with more than four corners, for instance).

The second triangular prism 2 can be replaced by a second optical component which satisfies the minimum requirements of having the fourth surface 2a which is struck by the reflected light and the fifth surface 2b through which the incident light comes out and allowing the reflected light to travel near the normal to the first surface 1a. Consequently, the second optical component can be a component having the fourth surface 2a and the fifth surface 2b with another cross-sectional profile (a prism which has a cross-sectional profile with more than four corners, for instance).

Second Embodiment

Figure 11:
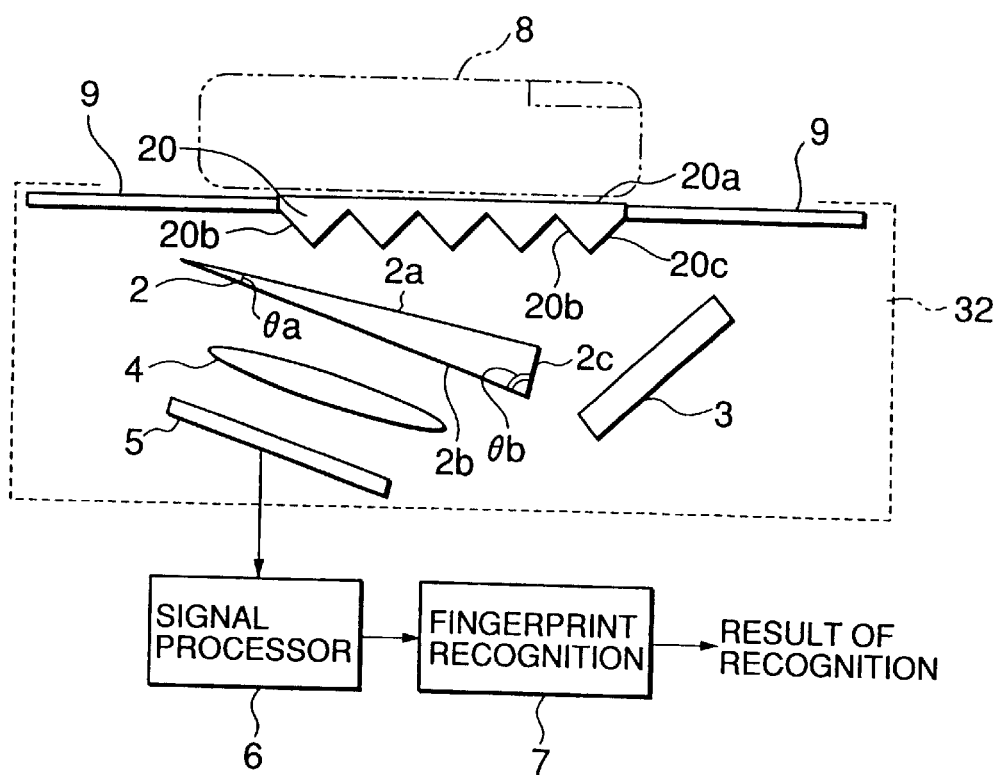
FIG. 11 is a diagram schematically showing a configuration of a fingerprint recognition system according to a second embodiment of the present invention.

FIG. 11 is a diagram schematically showing a configuration of a fingerprint recognition system according to a second embodiment of the present invention. Those structures in FIG. 11 that are identical to or correspond to structures in FIG. 1 are assigned identical symbols. The fingerprint recognition system shown in FIG. 11 is different from the fingerprint recognition system shown in FIG. 1 in that the first triangular prism 1, surrounded by the cover plate 9, is replaced by a prism array 20. The prism array 20 is shaped like a plurality of small triangular prisms having a cross section close to a right triangle, arranged side by side in parallel with one another. Two surfaces 20b and 20c forming the nearly right angle of each triangular prism in the prism array 20 respectively have, the same functions as the second surface 1b and the third surface 1c of the first triangular prism 1 shown in FIG. 1. The first surface 20a of the prism array 20 is continuous forming a single flat surface (surface on which the finger 8 is placed). The first surface 20a (i.e., flat surface 20) has such sufficient area that the human finger 8 can be placed. The number of the small triangular prisms may be different from that shown in the figure.

The operation of the fingerprint recognition system will next be described. The light source 3 is disposed to direct light toward the finger 8, and the light strikes the finger 8 through the prism array 20. The light source 3 is positioned so that the incident light hits the flat surface 20a of the prism array 20 at an incident angle of about 45 degrees.

Figure 12:
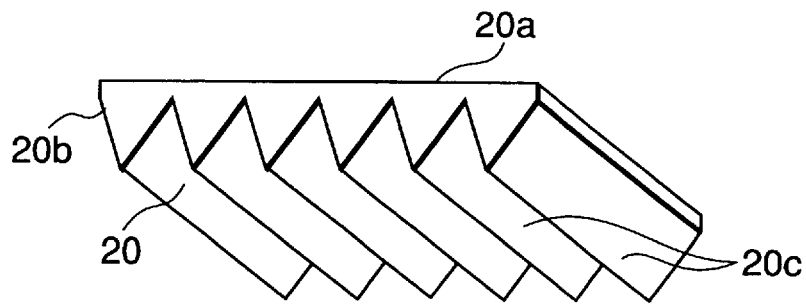
FIG. 12 is a perspective view showing the prism array of FIG. 11.

FIG. 12 is a perspective view showing the prism array 20. As shown in FIG. 12, the prism array 20 has a flat bottom, namely, the first surface 20a, on which the finger 8 is placed. The light emitted from the light source 3 passes through the third surface 20c of the prism array 20 and is reflected by the first surface 20a on which the finger is placed, and the reflected light comes out of the second surface 20b of the prism array 20.

Figure 13:
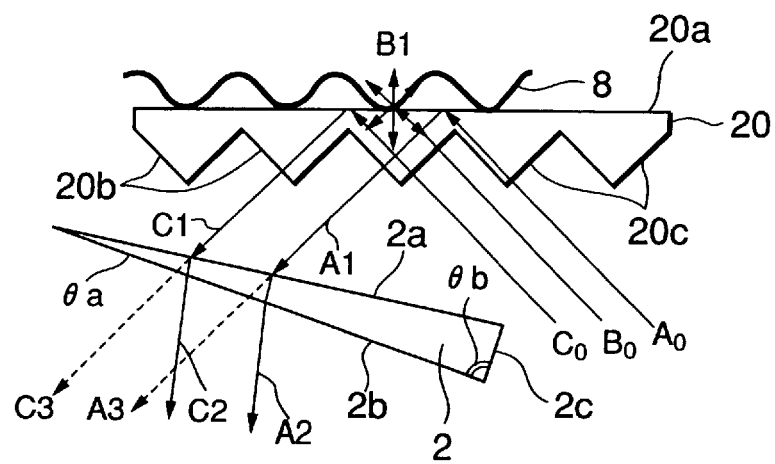
FIG. 13 is a diagram illustrating how a fingerprint placed on the prism array of FIG. 11 reflects light emitted from the light source and how the triangular prism of FIG. 11 refracts light from the prism array.

FIG. 13 is a diagram illustrating how the fingerprint placed on the prism array 20 reflects light from the light source 3 and how the triangular prism 2 refracts light from the prism array 20. Let the rays of the incident light from the light source 3 be $A_0$, $B_0$, and $C_0$. As described in the example of prior art, the finger 8 has ridges and valleys forming a fingerprint, and the ridges come into contact with the first surface 20a of the prism array while the valleys do not come into contact. On the first surface 20a of the prism array 20, the incident rays are dispersed where the fingerprint is in contact and are totally reflected where the fingerprint is not in contact. The incident ray $A_0$ passing through a third surface 20c comes out as the totally reflected ray $A_1$. The incident ray $C_0$ passing through another third surface 20c comes out as the totally reflected ray $C_1$. Meanwhile, the ray $B_0$ striking the area where the ridges of the fingerprint are in contact is dispersed and comes out as the dispersed ray $B_1$. In the light reflected by the prism array 20, the rays reflected from the valleys of the fingerprint are sensed by the image-sensing device 5 as having a higher intensity than those reflected from the ridges of the fingerprint. Consequently, a fingerprint image can be produced as in the first embodiment.

The rays $A_1$ and $C_1$ reflected from the fingerprint come out of the prism array 20 and are refracted by-the triangular prism 2. The refracted rays $A_2$ and $C_2$ of the reflected light pass through the condenser lens 4 and form an image on the image-sensing device 5, and the fingerprint image is sensed. If the second triangular prism 2 is not provided, the light path of the reflected rays $A_1$ and $C_1$ would be as indicated by broken lines $A_2$ and $C_3$, respectively. The principles of refraction and sensing are the same as those in the first embodiment.

Figure 14:
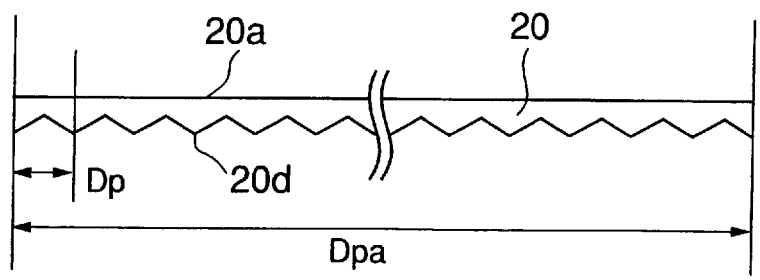
FIG. 14 is a diagram showing a pitch of the prism array of FIG. 11.
Figure 15:
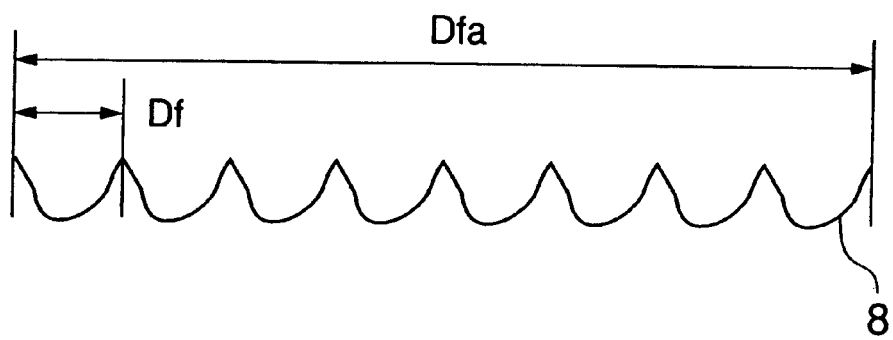
FIG. 15 is a diagram showing a size of a fingerprint and a pitch of ridges or valleys of the fingerprint.
Figure 16:
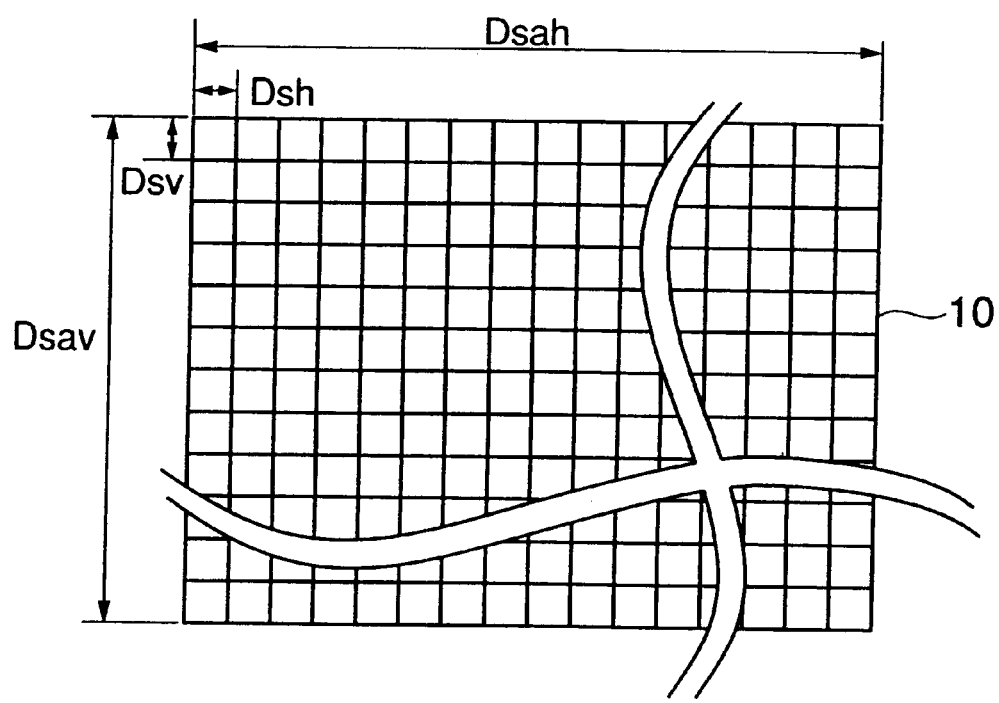
FIG. 16 is a diagram showing a size of an image sensor of the image-sensing device and a pitch of picture elements of the image sensor.

FIG. 14 is a diagram showing a pitch of the triangular prisms of the prism array 20. In FIG. 14, a reference symbol $D_{pa}$ denotes the size of the prism array 20, and a reference symbol $D_p$ denotes the distance representing a pitch of the triangular prisms of the prism array 20. FIG. 15 is an enlarged cross-sectional view showing a portion of the fingerprint of the finger 8. In FIG. 15, a reference symbol $D_{fa}$ denotes the dimension of the area of finger needed for identification, and a reference symbol $D_f$ denotes the distance between the valleys of the fingerprint. FIG. 16 is an enlarged view showing the image sensor 10 of the image-sensing device 5. In FIG. 16, the reference symbols $D_{sah}$ and $D_{sav}$ denote the horizontal and vertical dimensions of the image sensor 10, and the reference symbols $D_{sh}$ and $D_{sv}$ represent the dimensions of each pixel of the image sensor 10.

Among the elements provided as described above, the size $D_{pa}$ of the prism array 20 is greater than the dimension $D_{fa}$ of the subject area of the finger 8, and the dimension $D_{fa}$ of the area of the finger 8 needed for identification does not exceed $D_{sah}$ or $D_{sav}$ of the image sensor 10.

If an area (size $D_{fa}$) of the finger 8 forms an image having the dimensions $D_{sah}$ and $D_{sav}$, the fingerprint image of the finger 8 can be clearly sensed when the dimensions $D_{sh}$ and $D_{sv}$ of each pixel of the image sensor 10 simultaneously satisfy the following conditions so that the Nyquist frequency to the pitch of the fingerprint holds:

$$1/D_f < 1/(2*D_{sh}) \text{ and } 1/D_f < 1/(2*D_{sv})$$

accordingly $$D_{sh} < D_f/2 \text{ and } D_{sv} < D_f/2 \quad (1)$$

In the second embodiment, the pixels are designed to have such dimensions that these conditions are satisfied.

The condition (1) concurrently defines $D_{sh}$ and $D_{sv}$ because the image sensor 10 must satisfactorily sense the fingerprint in both horizontal and vertical directions, and consequently, the horizontal and vertical dimensions of the pixel against the pitch of the fingerprint must simultaneously satisfy the conditions given above.

In addition, the pitch $D_p$ of the triangular prisms of the prism array 20 must satisfy this condition:

$$D_p < D_{sh} \text{ or } D_p < D_{sv} \quad (2)$$

In the second embodiment, the prism array 20 is formed to satisfy this condition. Unlike the condition (1), the condition (2) of dimensions needs to be satisfied in either the horizontal or vertical direction. That is, the condition (2) of dimensions needs to be satisfied only in the same direction as the direction of the pitch of the prisms of the prism array 20.

This is because the direction of the pitch of the triangular prisms of prism array 20 and the horizontal and vertical positions of the image sensor 10 do not arbitrarily change. Once they are mounted, the mounting states are kept constant.

If the prism array 20 is formed to satisfy the condition (2), the line corresponding to the edge 20d of the prism array (see FIG. 14) would disappear from the fingerprint image formed on the image sensor 10. This is because when the pitch $D_p$ of the edge 20d of the prism array is smaller than the corresponding pixel dimension $D_{sh}$ or $D_{sv}$ (depending on how the image sensor 10 and the prism array 20 are mounted, as described above), satisfying the condition (2), the line corresponding to the edge 20d does not appear in the fingerprint image, with the resolution determined by the pixel pitch of the image sensor 10.

By forming the prism array 20 to satisfy the conditions given above, the fingerprint image used for fingerprint identification can be obtained without the processing for deleting the unnecessary line corresponding to the edge 20d from the sensed fingerprint image or the like.

As in the first embodiment, the fingerprint image obtained by the image-sensing device 5 is sent to the signal processor 6 and the fingerprint recognition section 7, thereby it is judged whether the finger 8 is of a person to be verified or whether the finger 8 is of one of any person registered in advance, and the result is output. The recognition can be implemented in the same way as in the first embodiment.

In the second embodiment, the optical member 20, on which the human finger 8 is placed, is configured by arranging small nearly-right-angle prisms in an array, so that this prism array 20 and the triangular prism 2 can be disposed closer to each other than in the first embodiment. Therefore, the system can be further reduced in size.

Because the optical member 20 on which the human finger 8 is placed is configured by arranging small nearly-right-angle prisms in an array, the length of the light path within prism can be substantially reduced in comparison with that in the prior art, resulting in a smaller ratio of the length of the light path within prism to the length of the light path from the light source 3 to the image-sensing device 5 in air. Consequently, the sensed fingerprint image is less affected by any change in the shape of the prism resulting from variations in temperature or the like, and the need for selecting a material having a small thermal expansion coefficient such as glass as the material of the optical member is eliminated. The prism array 20 can be made of a plastic or the like, and the prism array 20 can be reduced in weight, resulting in the reduced weight of the fingerprint recognition system.

Even if the prism array 20 is made of glass as before, the resultant size and weight can be smaller than before because the volume is smaller, so that the whole system can be reduced in size and weight.

Figure 17:
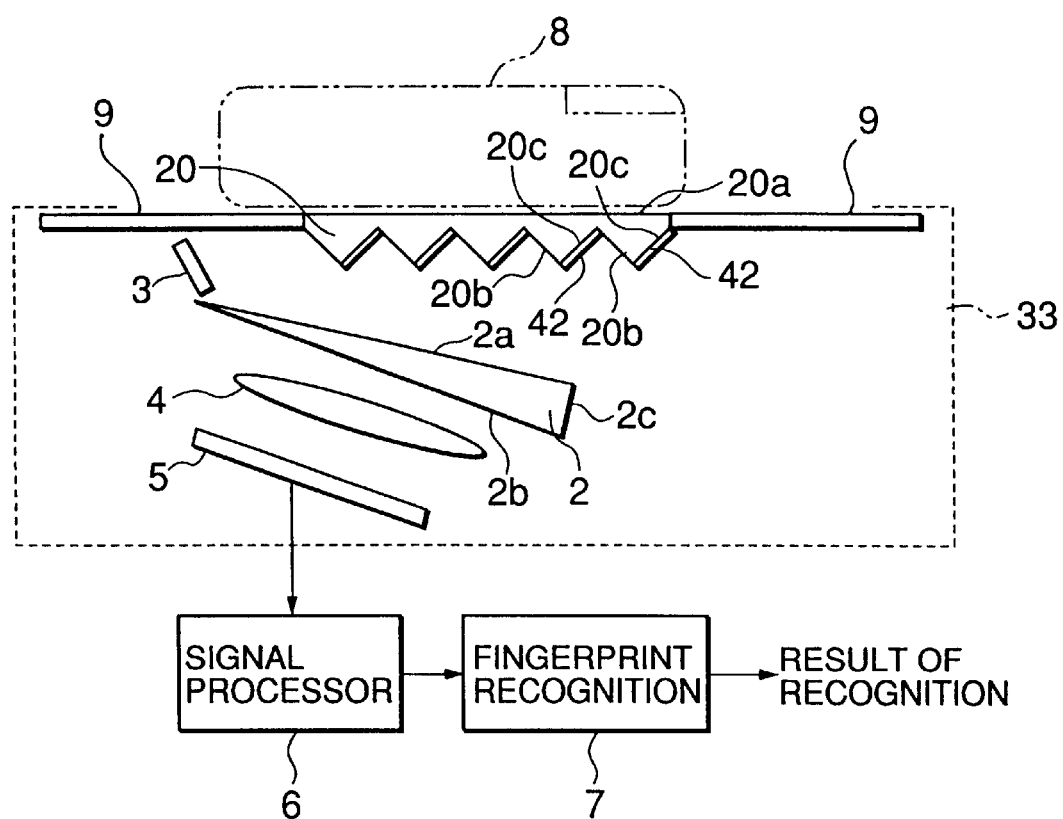
FIG. 17 is a diagram schematically showing a modified configuration of the fingerprint recognition system according to the second embodiment of the present invention.

The configuration of the fingerprint recognition system or the fingerprint sensor utilizing the prism array 20 of this embodiment is not limited to the sample configuration shown in FIG. 11, and the same effect can be produced by a configuration implementing the light path separation method in which the image-sensing device 5 is disposed on the same surface as the light source 3, as shown in FIG. 17, and just the rays of light dispersing from the ridges of the fingerprint are detected to obtain a fingerprint image. In this fingerprint sensor 33, however, the surface 20c of the prism array 20, opposite to the surface struck by the light emitted from the light source 3, must have a black layer of coating 42 to prevent the reflection by the surface 20c.

Except for the above points, the second embodiment is the same as the first embodiment.

Third Embodiment

Figure 18:
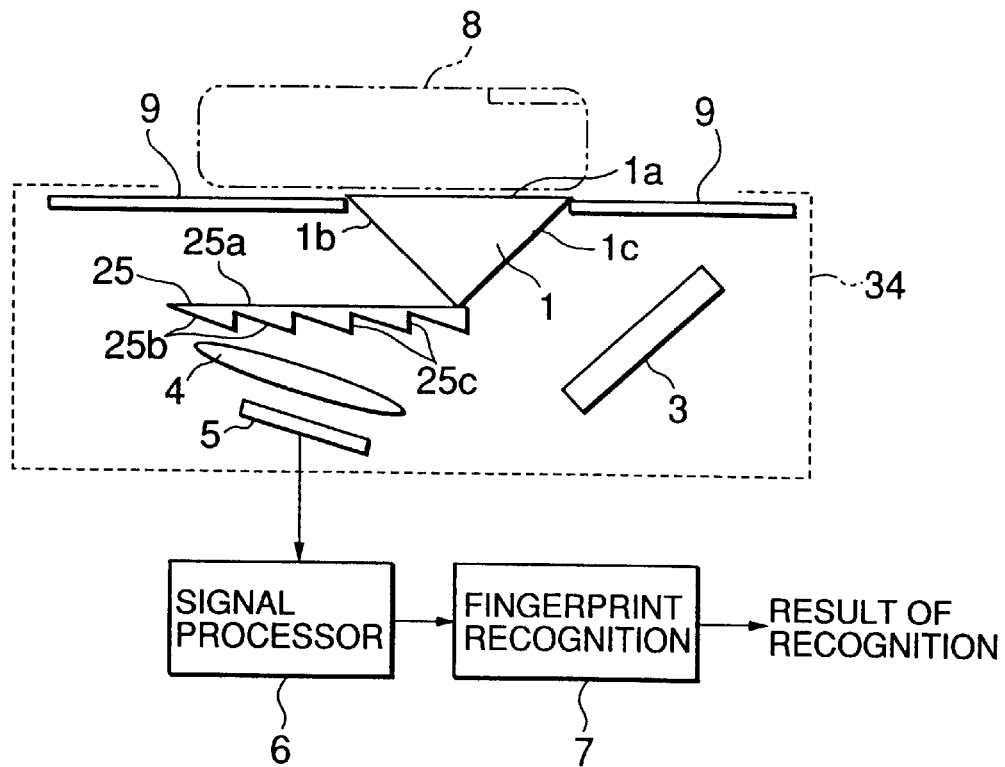
FIG. 18 is a diagram schematically showing a configuration of a fingerprint recognition system according to a third embodiment of the present invention.
Figure 19:
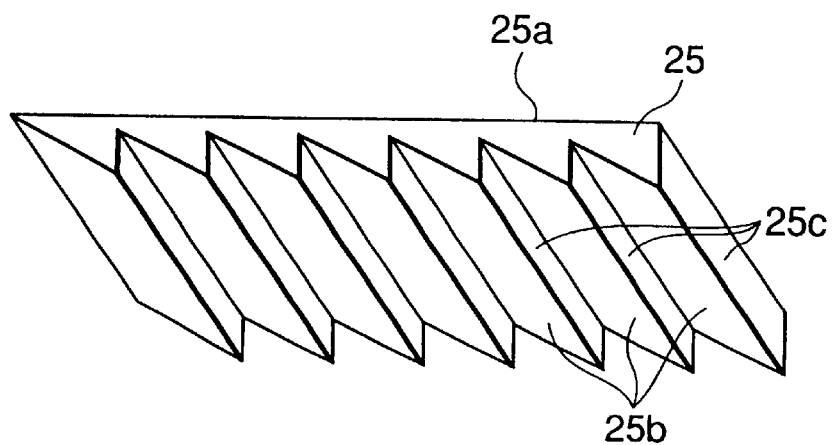
FIG. 19 is a perspective view showing the prism array of FIG. 18.

FIG. 18 is a diagram schematically showing a configuration of a fingerprint recognition system according to a third embodiment of the present invention. Those structures in FIG. 18 that are identical to or correspond to structures in FIG. 1 are assigned identical symbols. The fingerprint recognition system or the fingerprint sensor 34 shown in FIG. 18 is different from that shown in FIG. 1 only in that the second triangular prism 2 is replaced by the prism array 25. As shown in FIG. 18 and FIG. 19, the prism array 25 is formed by a plurality of small triangular prisms having a triangular cross section, arranged side by side in an array. The top surfaces of the triangular prisms forming the prism array 25 are continuous and form a single flat surface 25a. The number of the small triangular prisms may be different from that shown in the figure.

The prism array 25 is formed by a plurality of triangular prisms arranged in an array, and the appearance is as shown in FIG. 19. The fifth surface 25b is formed to be greater than or equal to the sixth surface 25c.

Figure 20:
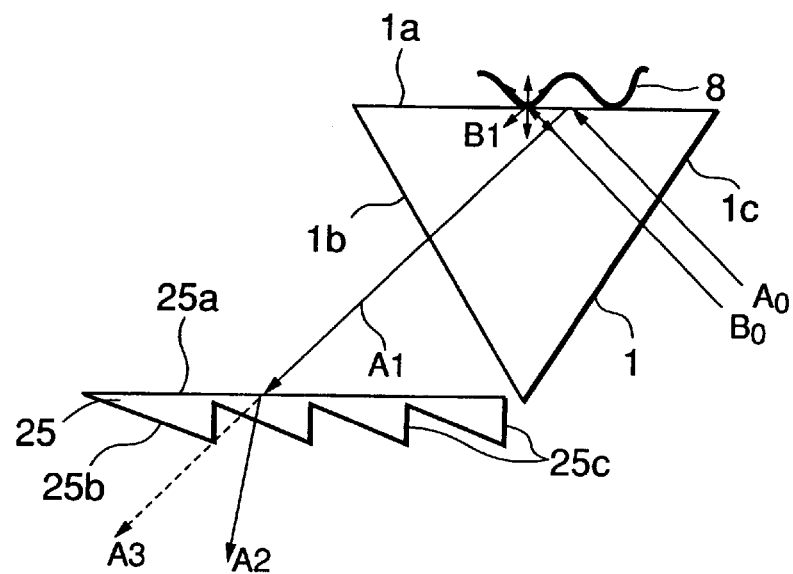
FIG. 20 is a diagram illustrating how a fingerprint placed on the triangular prism of FIG. 18 reflects light emitted from the light source and how the prism array of FIG. 18 refracts light from the triangular prism.

FIG. 20 is a diagram illustrating how the fingerprint placed on the triangular prism 1 reflects light from the light source and how the prism array 25 refracts light from the triangular prism. As shown in FIG. 20, the human finger 8 is placed on the first surface 1a of the triangular prism 1. The light emitted from the light source 3 passes through the third surface 1c of the triangular prism 1, is reflected by the first surface 1a of the triangular prism 1, and the reflected light comes out of the second surface 1b of the triangular prism 1. Let the rays of light emitted by the light source 3 be $A_0$ and $B_0$. The human finger 8 has ridges and valleys forming the fingerprint, and the ridges come into contact with the first surface 1a of the triangular prism 1 while the valleys do not come into contact. On the first surface 1a of the triangular prism 1, the rays of light are dispersed where the fingerprint is in contact and totally reflected where the fingerprint is not in contact. The incident ray $A_0$ comes out as the totally reflected ray $A_2$. The ray $B_0$ striking the area in which the ridges of the finger are in contact is dispersed and thrown to the image-sensing device 5 as the dispersed ray $B_2$. In the light reflected by the triangular prism 1, the rays corresponding to the valleys of the fingerprint are sensed by the image-sensing device 5 as having a higher intensity than those corresponding to the ridges, and consequently a fingerprint image can be produced.

The reflected light of the fingerprint comes out of the second surface 1b of the triangular prism 1 and passes the prism array 25, thereby the light is refracted and the light path changes. In FIG. 20, for instance, if the prism array 25 is not provided, the reflected ray $A_1$ would travel along the broken line A3. Because the triangular prism array 25 is provided, the ray of light is refracted to travel along the solid line $A_2$.

Figure 21:
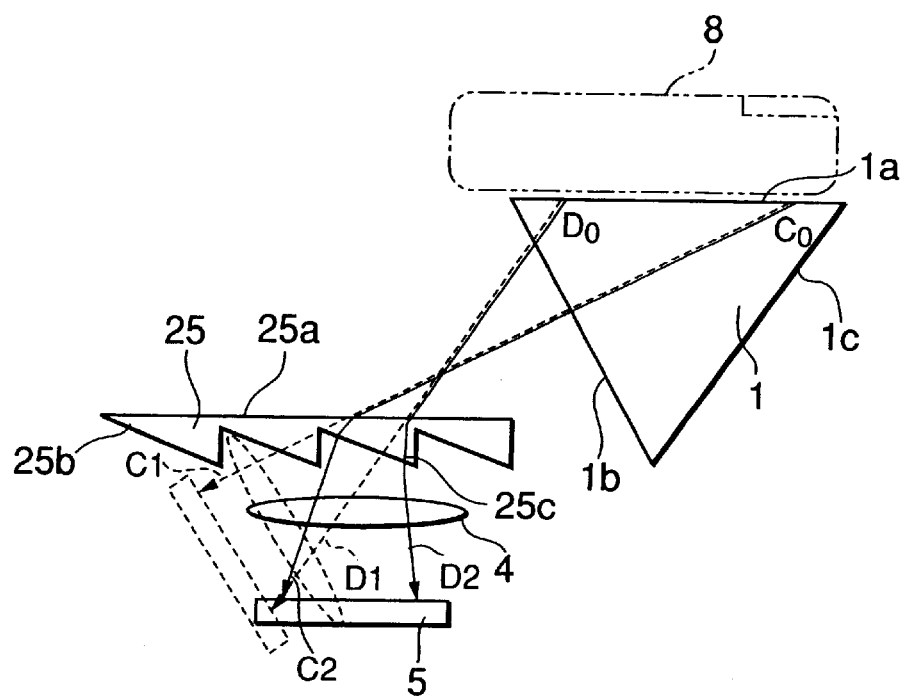
FIG. 21 is a diagram illustrating how the fingerprint sensor of FIG. 18 forms a fingerprint image on the image-sensing device.

FIG. 21 is a diagram illustrating how the fingerprint sensor 34 of FIG. 18 forms the fingerprint image on the image-sensing device 5. Let $C_0$ and $D_0$ be different portions of the finger placed on the first surface 1a of the first triangular prism 1. If the second triangular prism 2 is not provided, the ray corresponding to the portion $C_0$ and the ray corresponding to the portion $D_0$ would travel along the light paths $C_1$ and $D_1$, respectively, indicated by broken lines, and the image would be formed on the sensor indicated by a broken line. If the fingerprint placed on the first surface 1a of the triangular prism 1 is sensed at an angle, the light path length along the light path $D_1$ is shorter than the light path length along the light path $C_1$, so that the image of the fingerprint would be subjected to trapezoidal distortion, as shown in FIG. 5. $C_0$ and $D_0$ indicated on the trapezoid in FIG. 5 represent portions of the image, corresponding to the portions $C_0$ and $D_0$ of the finger 8 shown in FIG. 4.

In the third embodiment, in which the prism array 25 is disposed to pass the light reflected by the triangular prism 1, however, the rays of light reflected from the portions $C_0$ and $D_0$ of the finger 8 shown in FIG. 21 are refracted in the prism array 25, travel along the light paths $C_2$ and $D_2$ indicated by solid lines, and form an image on the image-sensing device 5. The difference between the light path length of the light path $C_2$ and the light path length of the light path $D_2$ when the prism array 25 is used to refract the light paths as indicated by solid lines in FIG. 21 is smaller than the difference between the light path length of the light path $C_1$ and the light path length of the light path $D_1$ in the example of prior art in which the prism array 25 is not used. Consequently, as in the first embodiment, the trapezoidal distortion of the image formed on the image-sensing device 5, as shown in FIG. 6, is lower than the prior art trapezoidal distortion, as shown in FIG. 5.

Figure 22:
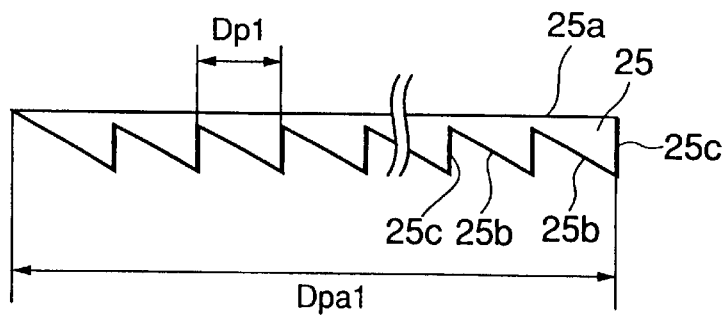
FIG. 22 is a diagram showing a pitch of the prism array of FIG. 18.
Figure 23:
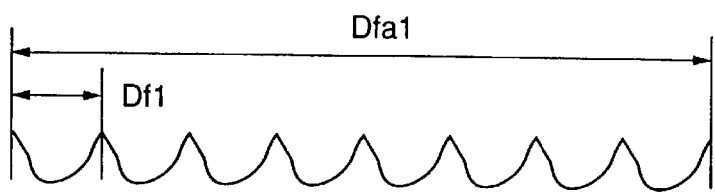
FIG. 23 is a diagram showing a size of a fingerprint and a pitch of ridges or valleys of the fingerprint.

FIG. 22 is a diagram showing a pitch of the triangular prisms of the prism array 25. In FIG. 22, a reference symbol $D_{pa}$ denotes the size (length) of the prism array 25, and a reference symbol $D_{p1}$ denotes the distance representing the pitch of the triangular prisms of the prism array 25. FIG. 23 is a diagram showing a size of the fingerprint and a pitch of the ridges or valleys of the fingerprint. In FIG. 23, a reference symbol $D_{fa1}$ denotes the size of the image of the figure required for identification, and a reference symbol $D_{f1}$ denotes the distance between the valleys of the fingerprint. The prism array 25 must satisfy the same conditions as those satisfied by the prism array 20 of the second embodiment for the same reasons.

In the third embodiment, the light path of the fingerprint image reflected by the triangular prism 1, on which the human finger 8 is placed, is refracted by the prism array 25, so that the trapezoidal distortion of the sensed image can be reduced, and the condenser lens 4 and image-sensing device 5 can be placed close to the subject. Therefore, the whole system can be reduced in size.

In the third embodiment, the optical member for refracting light from the triangular prism 1 is formed by arranging small nearly-right-angle prisms in an array, so that the triangular prism 1 and prism array 25 can be placed close to each other. Therefore, the system can be reduced in size.

The length of the light path within prism can be substantially reduced in comparison with that in the fingerprint recognition system of the prior art, resulting in a smaller ratio of the length of the light path within prism to the length of the light path from the light source 3 to the image-sensing device 5 in air. Consequently, the sensed fingerprint image is less affected by any change in the shape of the prism resulting from variations in temperature or the like, and the need for selecting a material having a small thermal expansion coefficient such as glass as the material of the prism array 25 is eliminated. The prism array 25 can be made of a plastic or the like, and the optical member can be reduced in weight, resulting in the reduced weight of the fingerprint recognition system.

Figure 24:
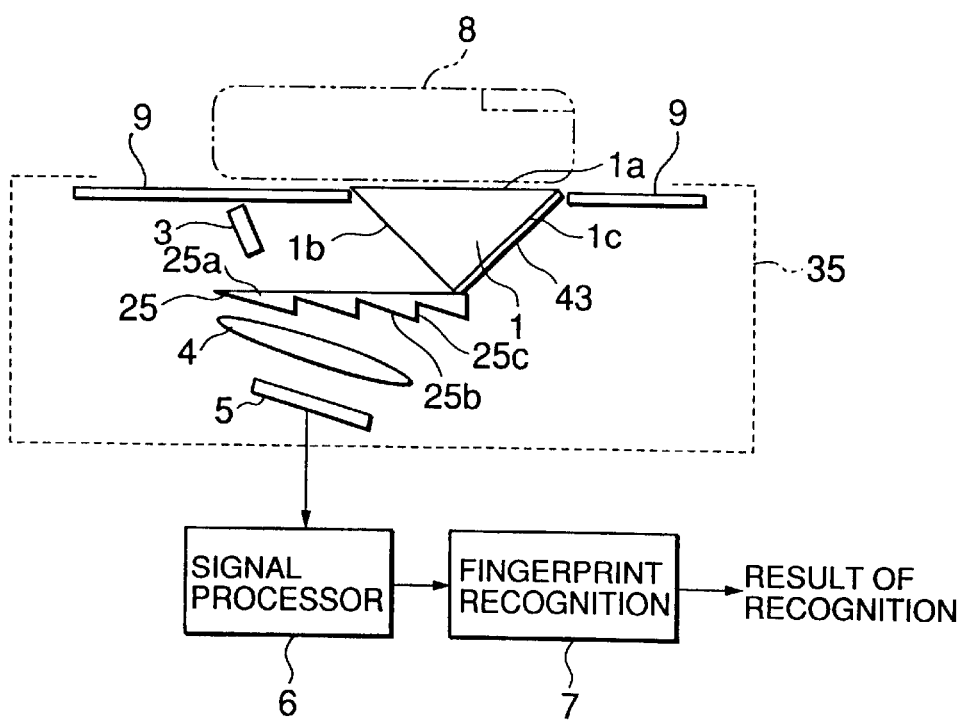
FIG. 24 is a diagram schematically showing a modified configuration of the fingerprint recognition system according to the third embodiment of the present invention.

The configuration of the fingerprint recognition system utilizing the triangular prism 1 and the prism array 25 of the present invention is not limited to the sample configuration shown in FIG. 18, and the same effect can of course be produced by a configuration implementing the light path separation method in which the light source 3 is disposed on the surface of the image-sensing device 5, as in the fingerprint sensor 35 shown in FIG. 24, and just the rays of light dispersing from the ridges of the fingerprint are detected to obtain a fingerprint image. In this fingerprint sensor 35, however, the third surface 1c of the triangular prism 1, opposite to the surface struck by the light emitted from the light source 3, must have a black layer of coating 43 to prevent the reflection by the third surface 1c.

Except for the above points, the third embodiment is the same as the first or second embodiment.

Fourth Embodiment

Figure 25:
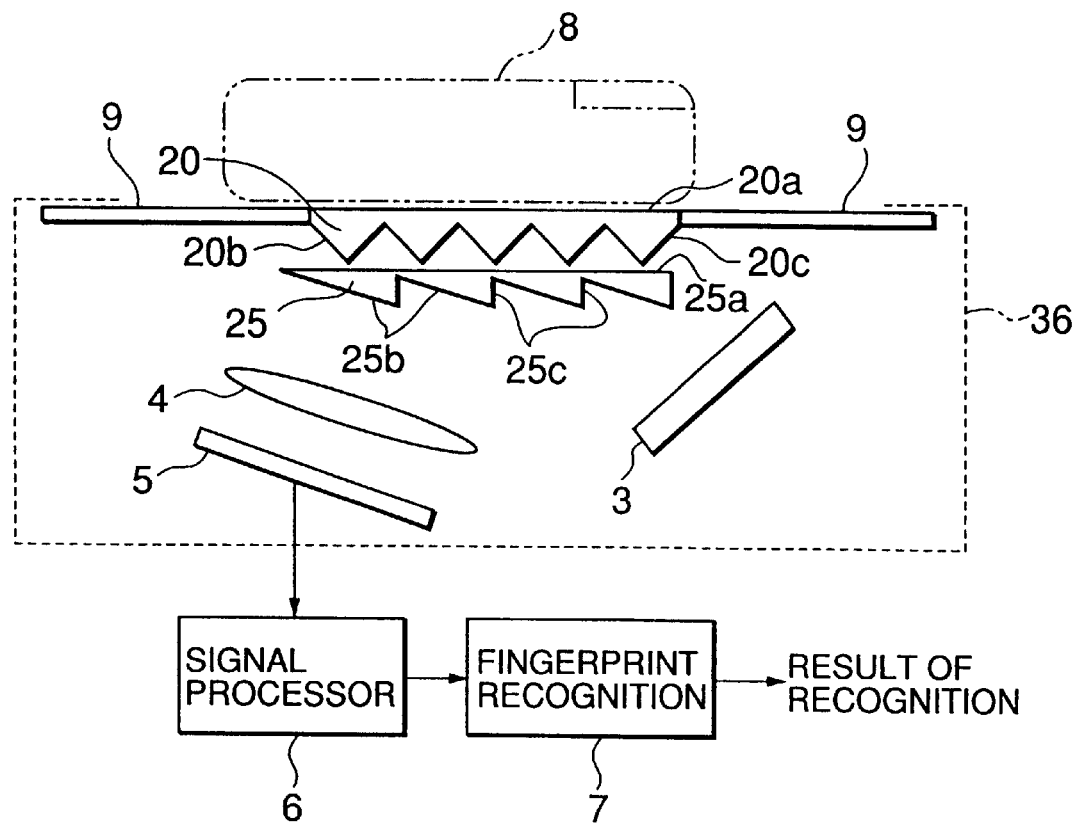
FIG. 25 is a diagram schematically showing a configuration of a fingerprint recognition system according to a fourth embodiment of the present invention.

FIG. 25 is a diagram schematically showing a configuration of a fingerprint recognition system according to a fourth embodiment of the present invention. Those structures in FIG. 25 that are identical to or correspond to structures in FIG. 1, FIG. 11, or FIG. 18 are assigned identical symbols. The fingerprint recognition system or the fingerprint sensor 36 shown in FIG. 25 is different from that shown in FIG. 1 only in that the first triangular prism 1 in FIG. 1 is replaced by the prism array 20 and that the second triangular prism 2 in FIG. 1 is replaced by the prism array 25. The prism arrays 20 and 25 are the same as those shown in FIG. 11 and FIG. 18, respectively.

The operation of the fingerprint recognition system configured as described above will next be described. The light source 3 is disposed to direct light toward the subject human finger 8, and the light strikes the human finger 8 through the third surface 20c of the prism array 20. The light source 3 is positioned so that the incident light hits the flat surface 20a of the first prism array 20 at an incident angle of about 45 degrees. The prism array 20 is a plurality of prisms far smaller than the human finger 8, connected side by side (in an array), as shown in FIG. 25, with the flat surface 20a having such sufficient area that the portion of the finger 8 needed for verification can be placed.

Figure 26:
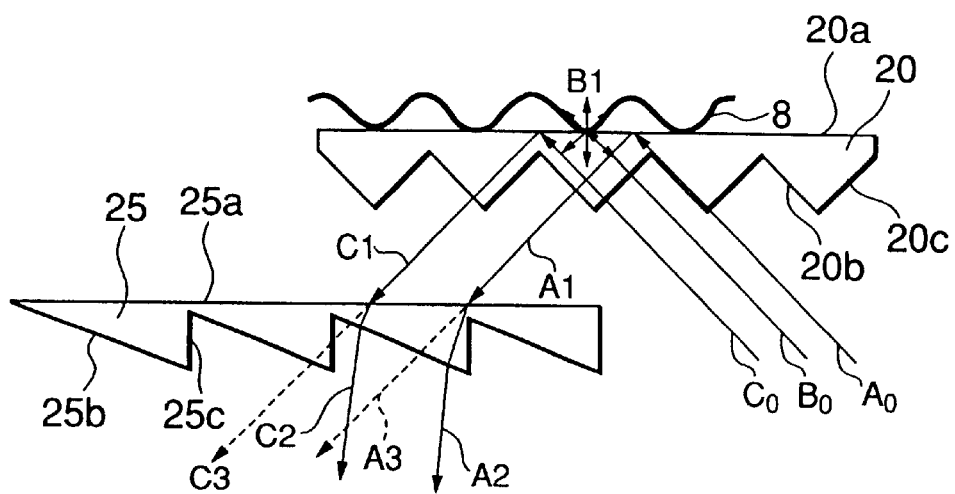
FIG. 26 is a diagram illustrating how a fingerprint placed on the prism array of FIG. 25 reflects light emitted from the light source and how the prism array of FIG. 25 refracts light from the prism array.
Figure 27:
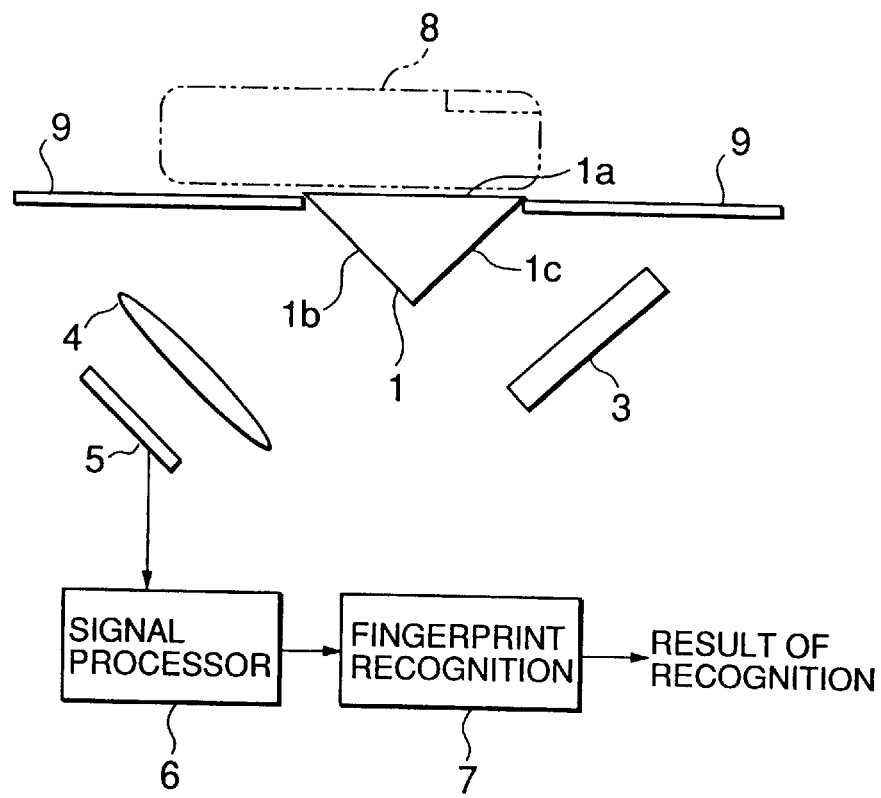
FIG. 27 is a diagram schematically showing a configuration of a prior art fingerprint recognition system.
Figure 28A:
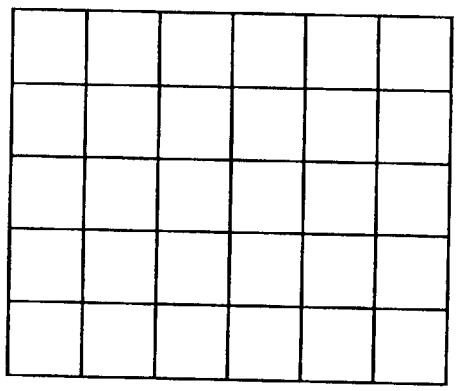
FIG. 28A and FIG. 28B are diagrams showing regularly arranged multiple squares as a subject to be sensed and a trapezoidal-distorted image of the regularly arranged multiple squares in the prior art fingerprint recognition system.
Figure 28B:
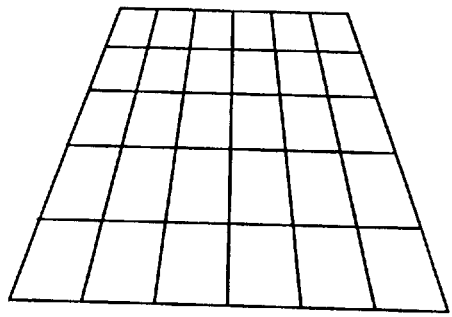

FIG. 26 is a diagram illustrating how the fingerprint placed on the prism array 20 of FIG. 25 reflects light from the light source and how the prism array 25 of FIG. 25 refracts light from the prism array 20. As shown in the figure, the first surface 20a of the prism array 20 is flat, and the human finger 8 is placed on the flat surface 20a. The light emitted from the light source 3 strikes the third surface 20c of the prism array 20 and is reflected by the flat surface of the first surface 20a of the prism array 20, and the reflected light comes out of the second surface 20b of the prism. The reflected rays $A_1$ and $C_1$ of the fingerprint coming out of the prism array 20 are refracted in the prism array 25. The refracted rays $A_2$ and $C_2$ of the reflected light pass through the condenser lens 4 and form an image on the image-sensing device 5, and the fingerprint image is sensed. The principles of refraction and sensing are the same as those in the first to third embodiments.

As in the first embodiment, the fingerprint image obtained by the image-sensing device 5 is sent to the signal processor 6 and the fingerprint recognition section 7, thereby it is judged whether the finger 8 is of a person to be verified or whether the finger 8 is of one of any person registered in advance, and the result is output. The recognition can be implemented in the same way as in the first embodiment.

In the fourth embodiment, the optical member, on which the human finger 8 is placed, and the other optical member for refracting the light are configured by arranging small nearly-right-angle prisms in an array, so that the first prism array 20 and the second prism array 25 can be disposed closer to each other than in the first embodiment. Therefore, the system can be further reduced in size.

Because the optical members are arranged in an array, the length of the light path within prism can be substantially reduced in comparison with that in the fingerprint recognition system of the prior art, resulting in a smaller ratio of the length of the light path within prism to the length of the light path from the light source 3 to the image-sensing device 5 in air. Consequently, the sensed fingerprint image is less affected by any change in the shape of the prism resulting from variations in temperature or the like, and the need for selecting a material having a small thermal expansion coefficient such as glass as the material of the optical member is eliminated. The prism arrays 20 and 25 can be made of a plastic or the like, and the fingerprint sensor can be reduced in weight, resulting in the reduced weight of the fingerprint recognition system.

Even if the first prism array 20 is made of glass as before, the resultant size and weight of the optical member can be reduced because the total volume of this optical member 20 is smaller than that before, so that the whole system can be reduced in size and weight.

Except for the above points, the fourth embodiment is the same as the first, second, or third embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A fingerprint sensor, comprising:
   a first optical component including a first surface on which a finger is placed and a second surface which forms a certain angle with respect to said first surface;
   a light source provided at a first side of said first optical component and emits light directly against said first optical component to irradiate the finger placed on said first surface with the light;
   an image sensor for receiving the light reflected from the finger and converting fingerprint information for the finger into an electric signal; and
   a second prism array of multiple second triangular prisms arranged side by side, said second prism array being provided at a second side opposite said first side with respect to said first optical component,
   each of said multiple second triangular prisms including a fourth surface, a fifth surface, and a sixth surface, said fifth surface being greater than said sixth surface such that an angle between said fourth surface and said fifth surface is smaller than an angle between said fourth surface and said sixth surface, the light emitted from said first optical component entering said second triangular prisms from said fourth surface and being emitted from said fifth surface,
   in light paths between said first optical component and said image sensor, said second prism array performing a first refraction of said light reflected from said finger placed on said first surface as said light enters said second prism array and performing a second refraction of said light as said light exits said second prism array towards said image sensor such that a difference between a first length of a light path from a first portion of said first surface to a first corresponding portion of said image sensor and a second length of a light path from a second portion of said first surface to a second corresponding portion of said image sensor is smaller than a difference between the first length and the second length without said second prism array and such that said light contacts the image sensor in a substantial normal direction to said irradiated finger.

2. The fingerprint sensor of claim 1, wherein
   said first optical component is a first triangular prism, and said first triangular prism includes said first surface, said second surface, and a third surface which forms certain angles with respect to said first surface and said second surface.

3. The fingerprint sensor of claim 1, wherein
   said first optical component is a first prism array of multiple first triangular prisms arranged side by side, and
   each of said multiple first triangular prisms includes said first surface, said second surface, and a third surface forming certain angles with respect to said first surface and said second surface.

4. The fingerprint sensor of claim 1, wherein the light from said light source strikes the finger placed on said first surface obliquely.

5. A fingerprint recognition system, comprising:

a fingerprint sensor for sensing light reflected from a finger and outputting an electrical signal regarding fingerprint information for the finger; and means for identifying the fingerprint of the finger on the basis of the electrical signal from said fingerprint sensor;

wherein said fingerprint sensor includes:

a first optical component including a first surface on which the finger is placed and a second surface which forms a certain angle with respect to said first surface, a light source provided at a first side of said first optical component and emits light directly against said first optical component to irradiate the finger placed on said first surface with the light, an image sensor for receiving the light reflected from the finger and converting fingerprint information for the finger into an electric signal; and a second prism array of multiple second triangular prisms arranged side by side, said second prism array being provided at a second side opposite said first side with respect to said first optical component, each of said multiple second triangular prisms including a fourth surface, a fifth surface, and a sixth surface, said fifth surface being greater than said sixth surface such that an angle between said fourth surface and said fifth surface is smaller than an angle between said fourth surface and said sixth surface, the light emitted from said first optical component entering said second triangular prisms from said fourth surface and being emitted from said fifth surface, in light paths between said first optical component and said image sensor, said second prism array performing a first refraction of said light reflected from said finger placed on said first surface as said light enters said second prism array and performing a second refraction of said light as said light exits said second prism array towards said image sensor such that a difference between a first length of a light path from a first portion of said first surface to a first corresponding portion of said image sensor and a second length of a light path from a second portion of said first surface to a second corresponding portion of said image sensor is smaller than a difference between the first length and the second length without said second prism array and such that said light contacts the image sensor in a substantial normal direction to said irradiated finger.

6. The fingerprint recognition system of claim 5, wherein said first optical component is a first triangular prism, and said first triangular prism includes said first surface, said second surface, and a third surface which forms certain angles with respect to said first surface and said second surface.

7. The fingerprint recognition system of claim 5, wherein said first optical component is a first prism array of multiple first triangular prisms arranged side by side, and each of said multiple first triangular prisms includes said first surface, said second surface, and a third surface forming certain angles with respect to said first surface and said second surface.

8. The fingerprint recognition system of claim 5, wherein the light from said light source strikes the finger placed on said first surface obliquely.

* * * * *